United States Patent [19]
Niino et al.

[11] Patent Number: 5,783,809
[45] Date of Patent: Jul. 21, 1998

[54] CARD PROCESSING DEVICE

[75] Inventors: Koji Niino, Miyazaki-gun; Hideo Yuji, Miyazaki, both of Japan

[73] Assignee: Sanwa New Tec Co., Ltd., Japan

[21] Appl. No.: 734,047

[22] Filed: Oct. 18, 1996

[30] Foreign Application Priority Data

Sep. 2, 1996 [JP] Japan .................. 8-248513

[51] Int. Cl.$^6$ ...................... G06K 19/08
[52] U.S. Cl. .................. 235/380; 235/381; 235/493
[58] Field of Search .................. 235/380, 381, 235/493

[56] References Cited

U.S. PATENT DOCUMENTS 5,644,750  7/1997  Iijima ............................ 235/380

FOREIGN PATENT DOCUMENTS 63-316196  12/1988  Japan .
2-105295  4/1990  Japan .

*Primary Examiner*—Don Wong
*Attorney, Agent, or Firm*—Lerner, David, Littenberg, Krumholz & Mentlik

[57] ABSTRACT

A card processing device capable of commonly attaining processing of a plurality of sorts of cards of the same specifications by means of a single card reader/writer. The card processing device includes a card including a print record layer and a magnetic record layer, as well as a card reader/writer including a thermal head for printing and a magnetic head for reading and writing. The magnetic record layer is provided with a card sort discrimination code record region, in which a card sort discrimination code for discriminating among a system card, a prepaid card, a stamp card and a point card is recorded. The card reader/writer has a prepaid card processing program, a stamp card processing program and a point card processing program stored therein, so that a program to be executed may be automatically selected depending on the card sort discrimination code read, resulting in card processing being attained.

23 Claims, 10 Drawing Sheets

| 12a | 12b | 12c | 12d | 12e |
|---|---|---|---|---|
| CARD SORT CODE RECORD REGION | ORGANIZATION ID CODE RECORD REGION | CARD PROVIDER ID CODE RECORD REGION | CARD ID RECORD REGION | UTILIZATION DATA RECORD REGION |

12

FIG. 1
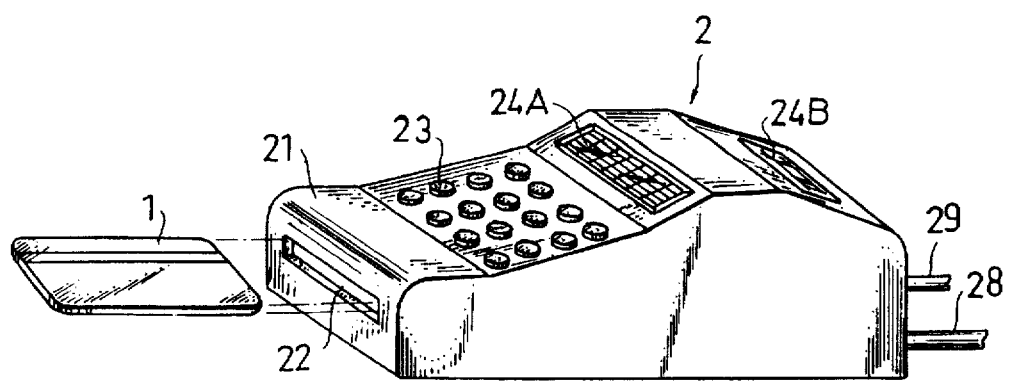
FIG. 2A
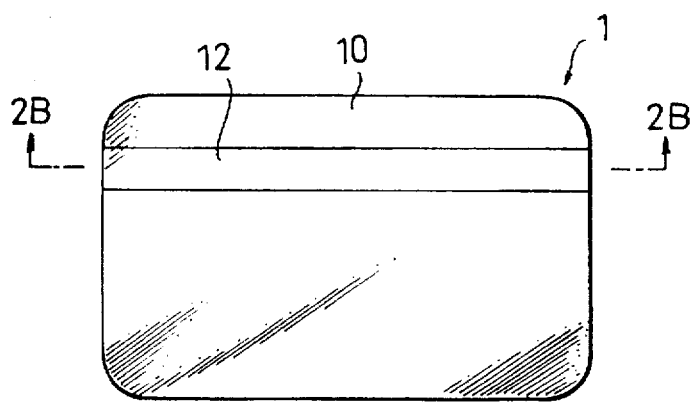
FIG. 2B
FIG. 2C
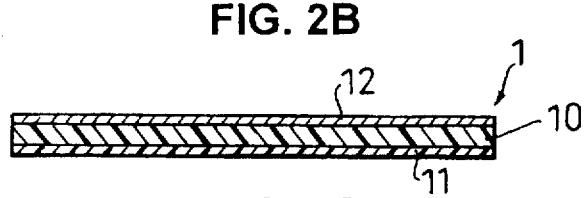

```
*STAMP CARD*    NO.123456
13-08-96   RENEWAL 3  [1234]
```

CONGRATULATIONS, FULL MARKS!

```
*STAMP CARD*    NO.000017
19-08-96 RENEWAL 0 [0220]
```

CONGRATULATIONS!
[RENEWAL/EXCHANGE]

CARD PROCESSING DEVICE

BACKGROUND OF THE INVENTION

This invention relates to a card processing device, and more particularly to a card processing device which permits a plurality of sorts of cards of the same specifications to be used for a plurality of applications and commonly processed by means of a single card reader/writer.

In an organization such as a local organization, an organization classified by industry or the like, which shops, stores or the like (hereinafter referred to as "shops") join, it is generally carried out to issue a prepaid card which is available in only member shops joining the organization. In such an organization, it is generally practiced that an executive office of the organization or the like issues the prepaid card and the member shops each install a card reader/writer for the prepaid card.

Also, the shop or organization generally employs a system of providing a customer with bonus points depending on a sum of purchase, to thereby present a prize to a customer who collected bonus points of a predetermined level so as to attain sales promotion. In order to facilitate management of such bonus points, it is conventionally carried out to provide a customer with a seal or seals having bonus points indicated thereon. Unfortunately, this requires the seals, as well as pasteboards for the seals, resulting in a manufacturing cost of the seals and pasteboards being expensive. In view of the above-mentioned problems, the organization or shop issues a card to a customer, so that the shop records marks, points or the like on the card by printing depending on a sum of purchase (i.e. bonus points) by means of a card reader/writer and concurrently magnetically records the purchase sum and the like in the card.

The terms "stamp card" and "point card" used herein indicate a card on which the number of stamps or marks corresponding to the number of bonus points are registered by printing and a card in which bonus points are recorded in a numeral, respectively. The stamp card and the point card are generally referred to as "bonus cards" herein.

However, in order that the shop introduces a system employing both a prepaid card and a stamp card or a point card, it is required to install both a card reader/writer exclusively used for the prepaid card and a card reader/writer exclusively used for the stamp card or point card, resulting in that a usable area of the shop is reduced due to a place required for installation of the card reader/writers, and burdens of installation and management on the shop are substantially increased.

SUMMARY OF THE INVENTION

Accordingly, it is an object of the present invention to provide a card processing device which is capable of accomplishing processing of both a prepaid card and a stamp card or point card by means of the cards of the same specifications and a single card reader/writer.

In accordance with the present invention, a card processing device is provided. The card processing device includes a card provided on one surface thereof with a magnetic record section which permits magnetic data to be recorded therein and on the other surface thereof with a print record section which permits printing to be carried out thereon, as well as a card reader/writer adapted to be charged therein with the card. The card reader/writer includes a data input key section, a printing means for printing on the print record section of the card according to a processing program through an operation of the data input key section and a read/write means for reading and writing data in the magnetic record section of the card when the card is charged in the card reader/writer. The magnetic record section of the card includes a card sort discrimination code record region for recording therein a card sort discrimination code indicating an application of the card. The card reader/writer also includes a program storage means in which a plurality of card processing programs are stored and a program selection and execution means for selecting one of the card processing programs from the program storage means depending on the card sort discrimination code read out from the card sort discrimination code record region and executing the one card processing program thus selected.

In a preferred embodiment of the present invention, the magnetic record section of the card further includes a card provider ID code record region for recording an ID code of a card provider therein, an organization ID code record region for recording therein an organization ID code of an organization which a card provider joins, a card ID code record region for recording an ID code of the card itself therein, and a utilization data record region for recording therein utilization data on utilization of the card.

In a preferred embodiment of the present invention, the card reader/writer includes a data memory means for storing therein the organization ID code previously registered, to thereby compare the registered organization ID code with the organization ID code read out from the organization ID code record region, resulting in the card being discharged without any of the card processing programs being executed when the registered organization ID code and the organization ID code do not coincide with each other.

In a preferred embodiment of the present invention, the card reader/writer is prohibited from writing data in the card provider ID code record region, organization ID code record region and card ID code record region of the magnetic record section of the card.

In a preferred embodiment of the present invention, the card sort discrimination code includes a system card code for discriminating a system card and the card reader/writer is transferred to a system setting mode which permits system setting to be practiced by an operation of the data input key section when the read/write means reads the system card code.

Also, in a preferred embodiment of the present invention, the card sort discrimination code includes one of a prepaid card code and a bonus card code, which card codes discriminate between a prepaid card and a bonus card. The program storage means is stored therein with a prepaid card processing program for recording a sum of expenditure with respect to an issued sum of the prepaid card both by printing a remaining amount on the print record section and magnetically recording the amount in the utilization data record region and a bonus card processing program for recording bonus points inputted through the data input key section both by printing the bonus points on the print record section and magnetically recording the bonus points in the utilization data record region.

In a preferred embodiment of the present invention, the card sort discrimination code includes one of a prepaid card code, a first bonus card code and a second bonus card code, which card codes discriminate among a prepaid card, a first bonus card and a second bonus card. The program storage means is stored therein with a prepaid card processing program for recording a sum of expenditure with respect to an issued sum of the prepaid card both by printing a remaining amount on the print record section and magnetically recording the amount in the utilization data record region, a first bonus card processing program for recording bonus points inputted through the data input key section by printing the number of marks corresponding to the number of the bonus points on the print record section and magnetically recording the bonus points in the utilization data record region, and a second bonus card processing program for recording bonus points inputted through the data input key section by printing a numeral on the print record section and magnetically recording the bonus points in the utilization data record region.

In a preferred embodiment of the present invention, the card reader/writer includes a preferential execution program designation means for designating which of the first bonus card processing program and second bonus processing program should be preferentially executed, so that when any card sort discrimination code does not exist in the card sort discrimination code record region of the card, the program designated by the preferential execution program designation means is executed and a card sort discrimination code corresponding to the program designated is written in the card sort discrimination code record region of the card.

In a preferred embodiment of the present invention, the print record section of the card comprises one of a self-coloring print record layer and a print record layer of a heat-reversible opaque type, which is laminated on a sheet-like substrate of the card and the printing means includes a print head comprising a thermal head.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIG. 1 is a schematic perspective view showing an embodiment of a card processing device according to the present invention;

FIG. 2A is a schematic plan view showing an example of a card which may be used in the card processing device of FIG. 1;

FIG. 2B is a sectional view taken along line 2B—2B of FIG. 2A;

FIG. 2C is a diagrammatic view showing a record region of the card of FIG. 2A in which magnetic data are recorded;

DETAILED DESCRIPTION OF THE PREFERRED EMBODIMENT

Figure 3:
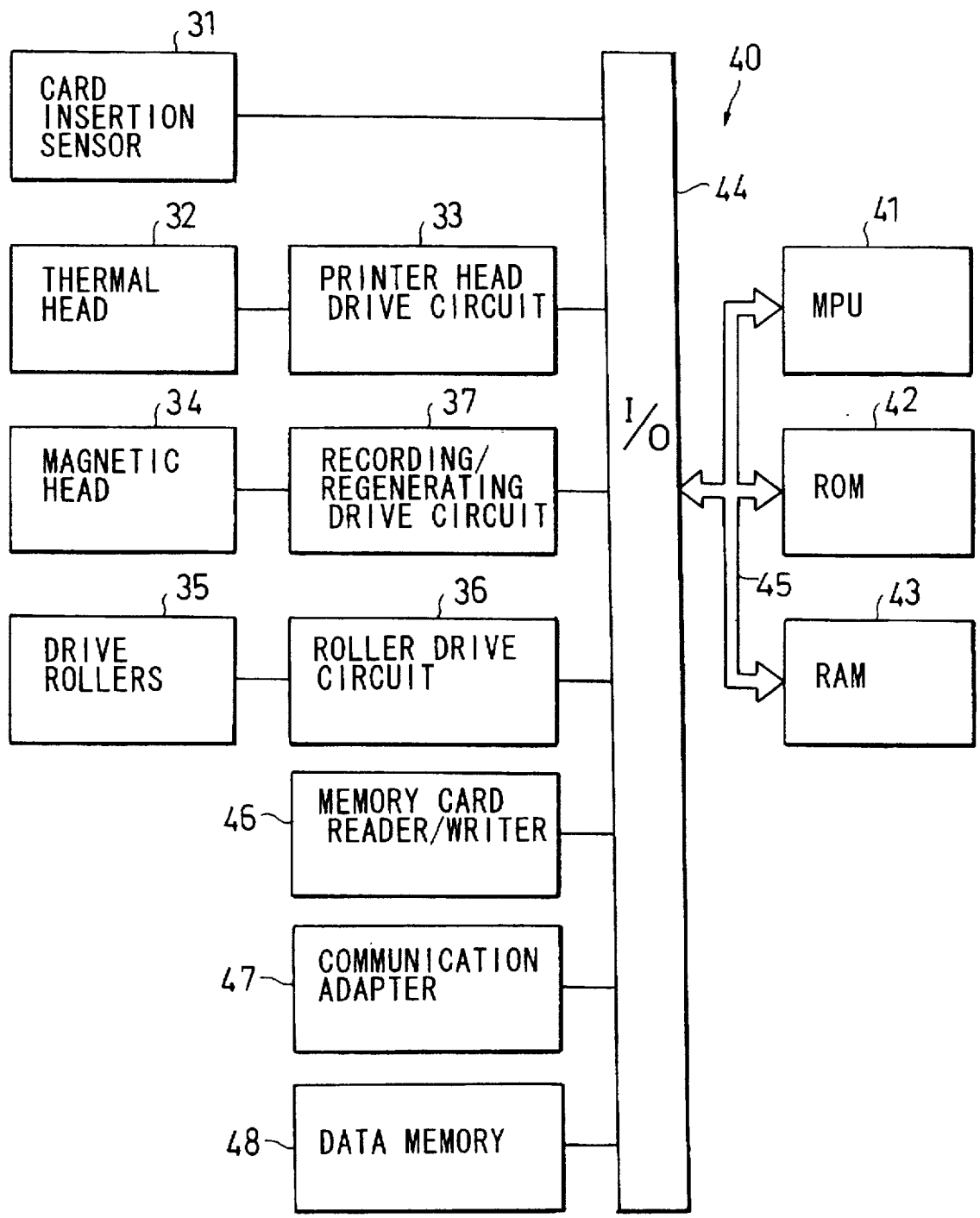
FIG. 3 is a block diagram showing a control system for a card reader/writer which is incorporated in the card processing device of FIG. 1.

Now, a card processing device according to the present invention will be described hereinafter with reference to the accompanying drawings.

Referring first to FIGS. 1 to 11, an embodiment of a card processing device according to the present invention is illustrated. In FIG. 1, reference numeral 1 designates a card and 2 designates a card reader/writer installed in a shop or the like. The card 1 may take any suitable form such as a system card, a prepaid card 1A, a stamp card 1B or a point card 1C.

Figure 10A:
FIG. 10A is a plan view schematically showing an example of a stamp card.
Figure 10B:
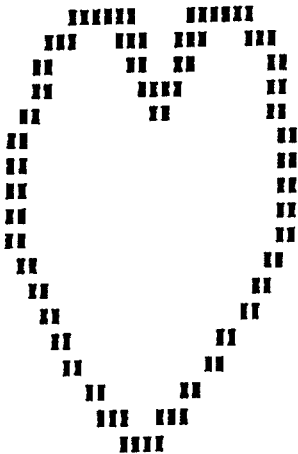
FIG. 10B is a plan view schematically showing another example of a stamp card.
Figure 11:
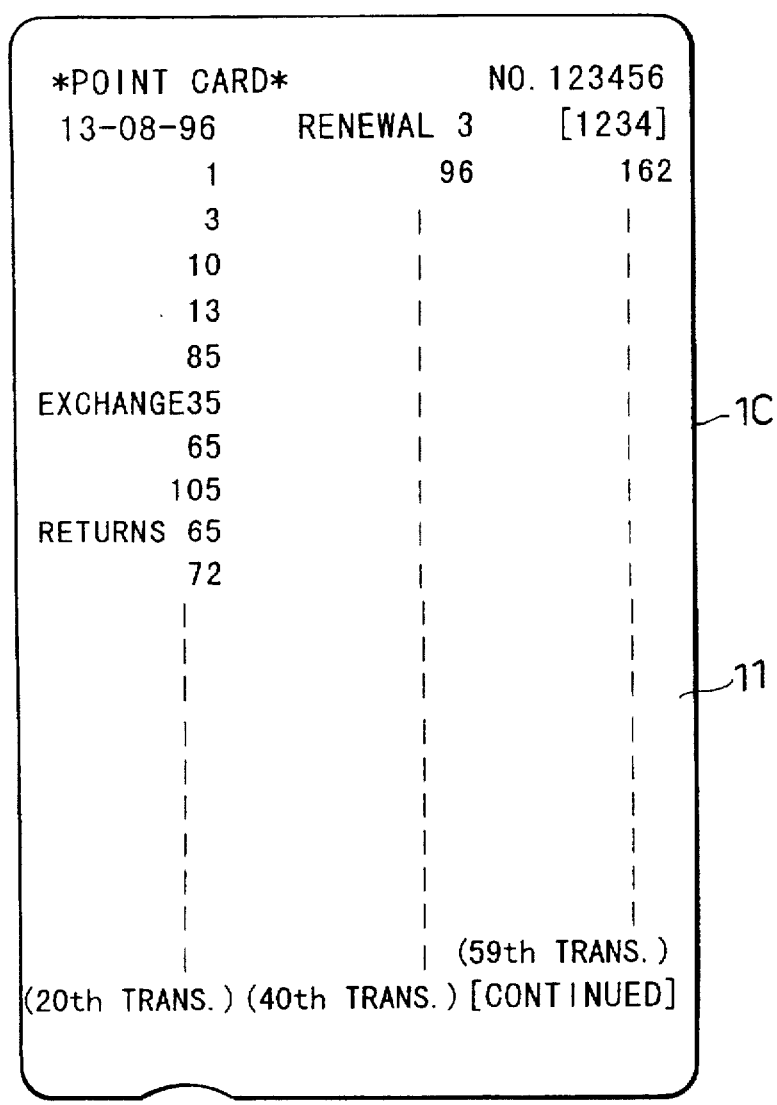
FIG. 11 is a plan view schematically showing an example of a point card.

As described above, the stamp card 1B is constructed so as to indicate, by the number of marks, reward or bonus points which a shop or the like provides a customer at every predetermined sum of purchase (see FIG. 10) and the point card 1C is constructed so as to indicate such bonus points by means of a numeral (see FIG. 11). Thus, the customer is allowed to exchange the stamp card 1B or point card 1C for a prize after he or she collects predetermined bonus points.

The card 1, as shown in FIGS. 2A and 2B, includes a sheet-like substrate 10 made of a resin material such as polyethylene terephthalate or the like, a print record layer 11 laminated on a whole front surface of the sheet-like substrate 10, and a magnetic record- layer 12 formed in a strip-like manner on a rear surface of the substrate 10. The print record layer 11 may be in the form of an unreloadable self-coloring print record layer or a reloadable record layer of the heat-reversible transparent-opaque-type which permits thermal printing to be carried out thereon. Thus, in the illustrated embodiment, the card 1 may be subjected to printing by means of a thermal head of the card reader/writer 2 described hereinafter.

The magnetic record layer 12 may be formed by application of a magnetic material widely known in the art to the sheet-like substrate 10 or adhesion of a magnetic tape thereto, which is then subjected to reading and writing of data by means of a magnetic head described hereinafter. The magnetic record layer 12 thus formed is divided or partitioned into a card sort discrimination code record region 12a, an organization identification (ID) code record region 12b, a card provider ID code record region 12c, a card ID code record region 12d and a utilization data record region 12e.

The card sort discrimination code record region 12a has a card sort discrimination code for indicating a sort of the card recorded therein. Likewise, the organization ID code record region 12b has an organization ID code for indicating an organization which card providers such as shops or the like join recorded therein. The card provider ID code record region 12c has a card provider ID code recorded therein. The card ID code record region 12d has a card ID code of a card itself and the like recorded therein and the utilization data record region 12e has utilization data on utilization of the card recorded therein while being renewed.

The card sort discrimination code is recorded in the form of digital data having a predetermined number of bits and functions to carry out discrimination among the system card, prepaid card 1A, stamp card 1B and point card 1C. Likewise, the organization ID code, card provider ID code and card ID code are each recorded or stored in the form of digital data. The organization ID code indicates an ID number of an organization, which card providers, shops or the like join. The card provider ID code indicates an ID number of each of card providers, shops or the like. The card ID code indicates an ID number of the card itself, an issue number of the card or the like. The utilization data are likewise recorded in the form of digital data.

The card reader/writer 2 includes a casing 21, which is formed on a front surface thereof with a card access port 22 and provided on an upper portion thereof with a key input section 23. Also, the card reader/writer 2 is provided on the upper portion thereof with liquid crystal display sections 24A and 24B in a manner to be spaced from each other in a longitudinal direction thereof. The key input section 23 is provided with a plurality of data input keys which may include, for example, numeral keys for numerals 0 to 9, six function keys and the like. In FIG. 1, reference numeral 28 designates a power cable and 29 designates a communication cable for connecting the card reader/writer 2 to a register, a personal computer or the like. As described below, the card reader/writer 2 may be provided with a reader/writer unit or the like for a memory card in which a history of card processing is recorded, as shown in FIG. 3.

Also, the card reader/writer 2 is provided therein with a card travel passage (not shown) in a manner to communicate with the card access port 22, along which passage a card insertion sensor 31, a thermal head 32, a magnetic head 34 and drive rollers 35, each of which may be constructed in such a manner as widely known in the art are arranged in order, as shown in FIG. 3. The card insertion sensor 31 may comprise a photosensor or the like which is constructed so as to optically detect the card 1 inserted through the card access port 22 into the card reader/writer 2 and is connected to a controller 40. The drive rollers 35 of which a drive motor is connected to a roller drive circuit 36 function to transfer the card 1 charged in the card reader/writer 2 through the card access port 22. The thermal head 32 is connected to a thermal head drive circuit 33 to subject the card 1 to print processing and the magnetic head 34 is connected to a recording/regenerating circuit 37 to carry out reading out magnetic data from the magnetic record layer 12 of the card 1 and writing magnetic data in the magnetic record layer 12.

The controller 40 includes a microprocessor unit (MPU) 41, a ROM 42, a RAM 43 and an input/output interface (I/O) 44 which may be constructed in a manner widely known in the art and are connected to each other by means of a data bus 45. The ROM 42 has a prepaid card processing program, a point card processing program, a stamp card processing program and the like stored therein. Also, it is stored therein with graphic data on a mark to be printed on a stamp card and the like.

The input/output interface 44 has connected thereto the above-described card insertion sensor 31, thermal head drive circuit 33, recording/regenerating drive circuit 37 and roller drive circuit 36, as well as a memory card reader/writer 46, a communication adapter 47 and a data memory 48. As described above, the card insertion sensor 31 generates a detection signal upon insertion of the card 1 into the card access port 22, so that the thermal head drive circuit 33 drives the thermal head 32, the recording/regenerating circuit 37 drives the magnetic head 34 and the roller drive circuit 36 feeds the motor and the like with an electric power to drive the drive rollers 35.

The memory card reader/writer 46 is charged therein with a memory card constructed in a manner widely known in the art so as to carry out reading and writing of data with respect to the memory card. The communication adapter 47 has the communication cable 29 described above connected thereto. The data memory 48 has an organization ID code for reference, as well as bonus point data stored or recorded therein. Also, the data memory 48 has data on an order of execution of the prepaid card processing program, point card processing program, stamp card processing program recorded therein in a reloadable manner. In the data memory 48, data on bonus points purchased by a shop from an executive office of an organization, which the shop joins, are recorded or registered by means of a system card, so that bonus points given to the point card 1C or stamp card 1B are subtracted from the bonus points thus registered. In the illustrated embodiment, the stamp card processing program may be recorded as a preferentially executed program in the data memory 48.

The illustrated embodiment may be so constructed that the data memory 48 of the card reader/writer 2 has the organization ID code stored or recorded therein in an unreloadable manner. Also, when cards 1 prepared so as to be distributed between shops joining the organization are processed, the organization ID code record region 12b of the magnetic record section 11 of each of the cards 1 has the organization ID code previously magnetically recorded therein before the cards 1 are issued to the shops. Then, an executive office of the organization or the like magnetically records one of different card sort discrimination codes in the card sort discrimination code record region 12a of each card 1 having the organization ID code thus written therein, resulting in the card 1 being prepared as the system card, prepaid card 1A, stamp card 1B or point card 1C. Then, the card 1 of which a sort is thus specified or the card 1 in which the card sort discrimination code and the like other than the organization ID code are not yet written is provided to a shop or the like as required.

Figure 9:
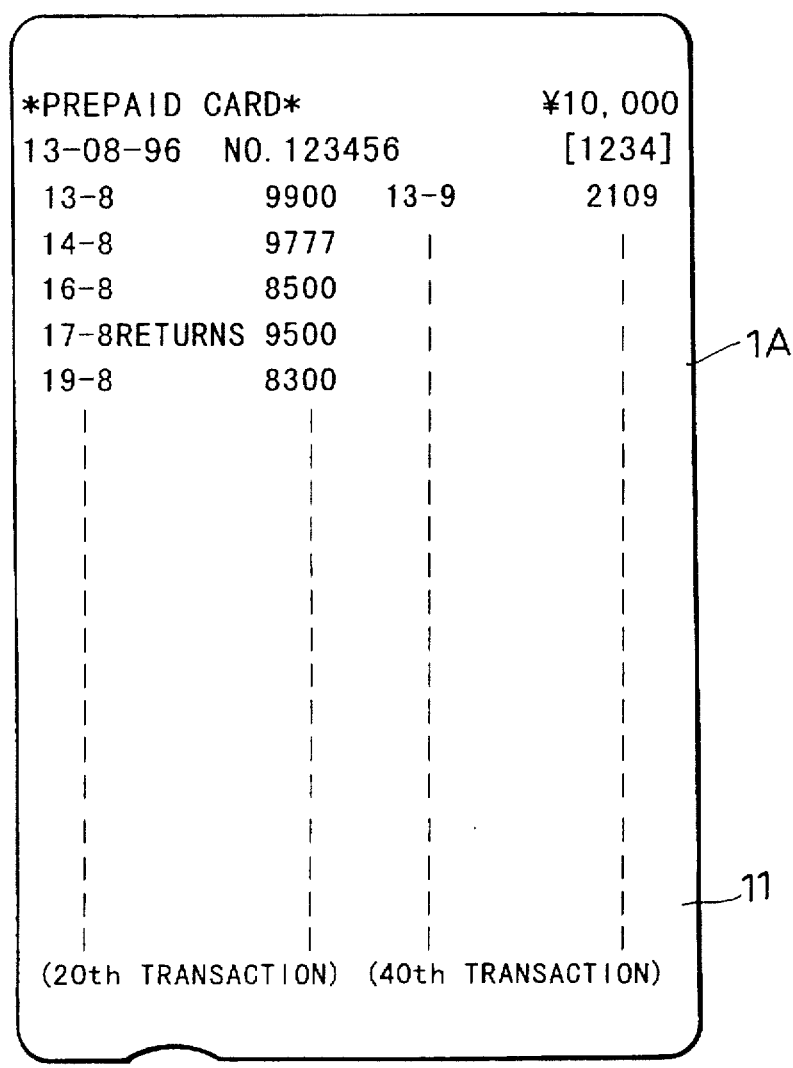
FIG. 9 is a plan view schematically showing an example of a prepaid card.

Thus, when the executive office of the organization, a shop or the like is to issue the prepaid card 1A to a customer, it records or writes the prepaid card code in the card sort discrimination record region 12a of the card 1 in which card the organization ID code was written, its card provider ID code in the card provider ID code record region 12c, the card ID code in the card ID code record region 12d, and data on an issued sum and the like in the utilization data record region 12e. Also, it prints the sort of the card (prepaid card), an issue date thereof (for example, 13-08-1996), a card ID number thereof (for example, No. 123456), an issue number thereof (for example, 1234), an issued sum thereof (for example, ¥10,000) and the like on the print record layer 11 of the card 1, as shown in FIG. 9.

Also, when the executive office of the organization or the like is to issue the stamp card 1B, it writes the stamp card code in the card sort discrimination code record region 12a of the card 1, its card provider ID code in the card provider ID code record region 12c, and the card ID code in the card ID code record region 12d. Also, it prints the sort of the card (stamp card), an issue date thereof (for example, 13-08-1996), a card ID number thereof (for example, No. 123456), an issue number thereof (for example, 1234) and the like on the print record layer 11 of the card 1, as shown in FIG. 10A. Likewise, when the executive office of the organization or the like is to issue the point card 1C, the point card code and the like are written in the card sort discrimination code record region 12a of the card 1 and the like, and the card sort (point card) and the like are recorded on the print record section 11 of the card 1 by printing, as shown in FIG. 11.

In a shop or the like, the card 1 possessed by a consumer is inserted through the card access port 22 into the card reader/writer 2 by a clerk of the shop, resulting in the card 1 being subjected to suitable processing by the single card reader/writer 2 depending on a sort of the card 1. More particularly, the sensor 31 detects the card 1 inserted through the card access port 22 into the card reader/writer 2 and the drive rollers 35 are driven depending on a detection signal of the sensor 31 to permit the card 1 to travel. During such an operation, programs shown in FIGS. 4 to 8 are executed, to thereby subject the card 1 to suitable processing depending on the sort of the card 1.

Now, processing by the card reader/writer 2 will be described hereinafter according to flowcharts shown in FIGS. 4 to 8.

Figure 4:
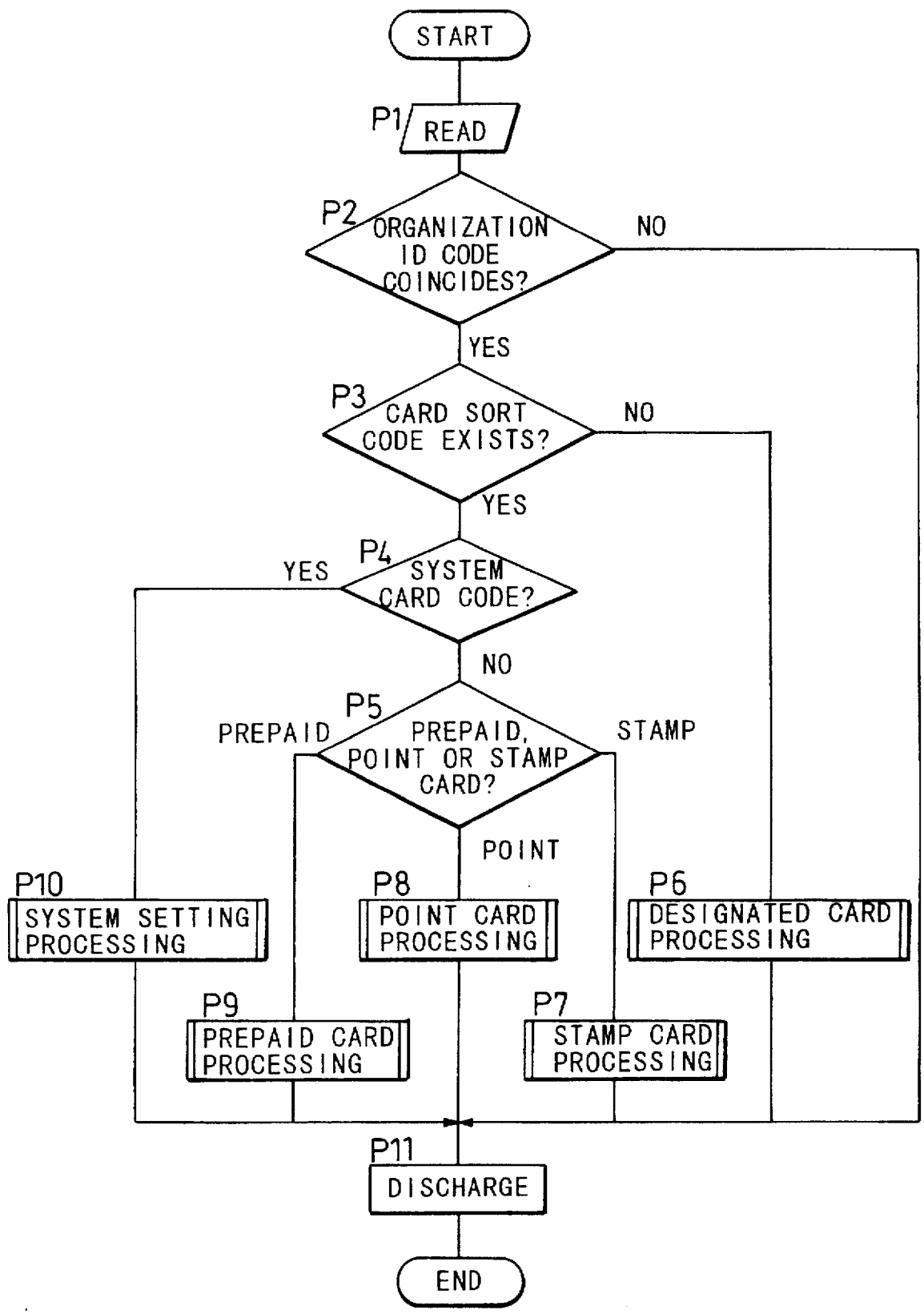
FIG. 4 is a flowchart showing a main routine in control processing of a card reader/writer.

First, a main routine is executed according to the flowchart shown in FIG. 4. More particularly, in a step P1, data recorded in the magnetic record section 12 of the card 1 are read by the magnetic head 34. Then, in a step P2, it is judged whether or not the organization ID code recorded in the organization ID code record region 12b of the magnetic record section 12 of the card 1 coincides with the organization ID code recorded in the data memory 48. When the organization ID code of the card 1 does not coincide with the organization ID code of the data memory 48 or any data do not exist in the organization ID code record region 12b of the card 1, processing in a step P11 takes place to discharge the card 1 from the card reader/writer 2; whereas when both coincide with each other, processing in a step P3 is executed.

In the step P3, it is judged whether or not the card sort discrimination code exists, that is, whether or not recording of the system card code, prepaid card code, point card code or stamp card code is made. When the recording is made, processing in a step P4 is carried out; whereas when the recording is not made, designated card processing is executed in a step P6. In the step P4, it is judged whether or not the card 1 is a system card, that is, data written in the card sort discrimination code record region 12a are a system card code. When the judgment is "yes", system setting processing in a step P10 is executed; whereas when it is "no", processing in a step P5 is carried out.

In the step P5, it is discriminated whether or not the data written in the card sort discrimination code record region 12a of the card 1 are one of the prepaid card code, point card code and stamp card code, that is, whether or not the card is one of the prepaid card, point card and stamp card. When it is judged to be the prepaid card, prepaid card processing in a step P9 is executed; whereas when it is judged to be the point card, point card processing in a step P8 is practiced. Also, when it is judged to be the stamp card, stamp card processing is carried out in a step 7. Then, in the step P11, the drive circuit 36 drives the drive rollers 35, to thereby discharge the card 1 through the card access port 22 from the card reader/writer 2.

Figure 5:
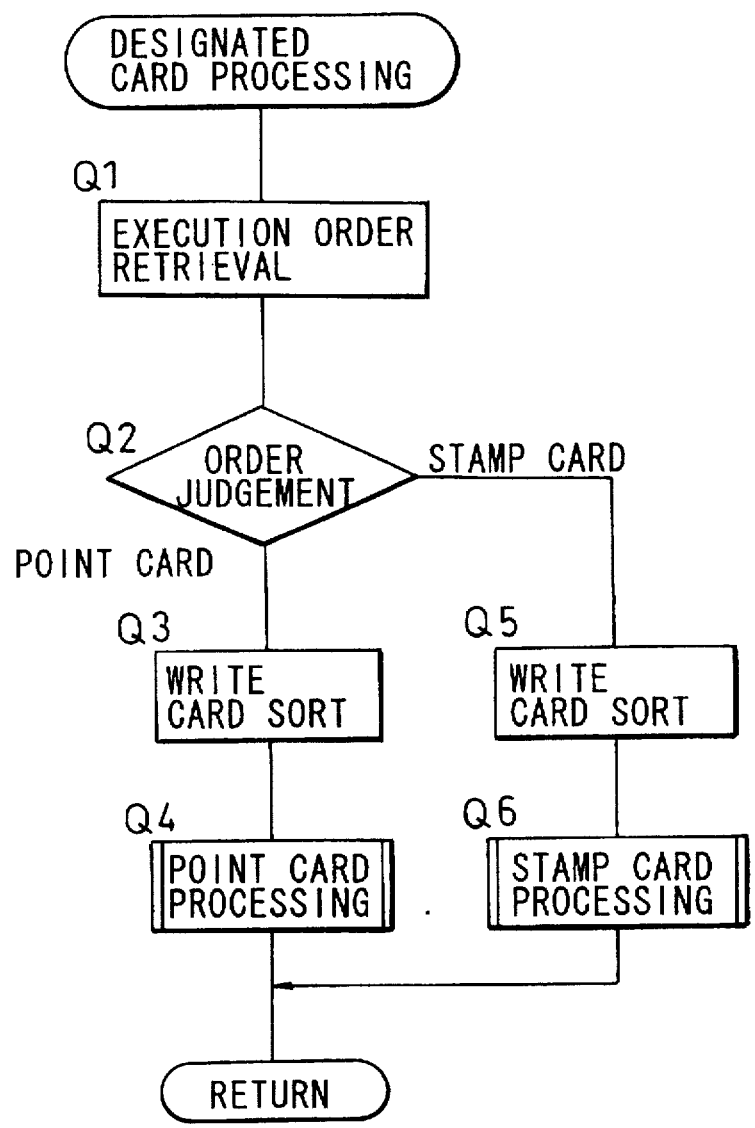
FIG. 5 is a flowchart showing a subroutine in control processing of the card reader/writer.

The designated card processing in the step P6 executes a subroutine shown in the flowchart of FIG. 5. More specifically, in a step Q1, execution order data stored in the data memory 48 is read out from the data memory 48 and then judgment of a program to be subjected to preferential execution is carried out in a step Q2. When the program to be subjected to preferential execution is a point card processing program, the procedure proceeds to a step Q3, wherein a point card code is written in the card sort discrimination code record region 12a of the card 1, followed by point card processing (step P8) in a step Q4. When the program subjected to preferential execution is judged to be a stamp card processing program in the step Q2, a stamp card code is written in the card sort discrimination code record region 12a of the card 1 in a step Q5, followed by stamp card processing (step P7) in a step Q6.

Figure 6:
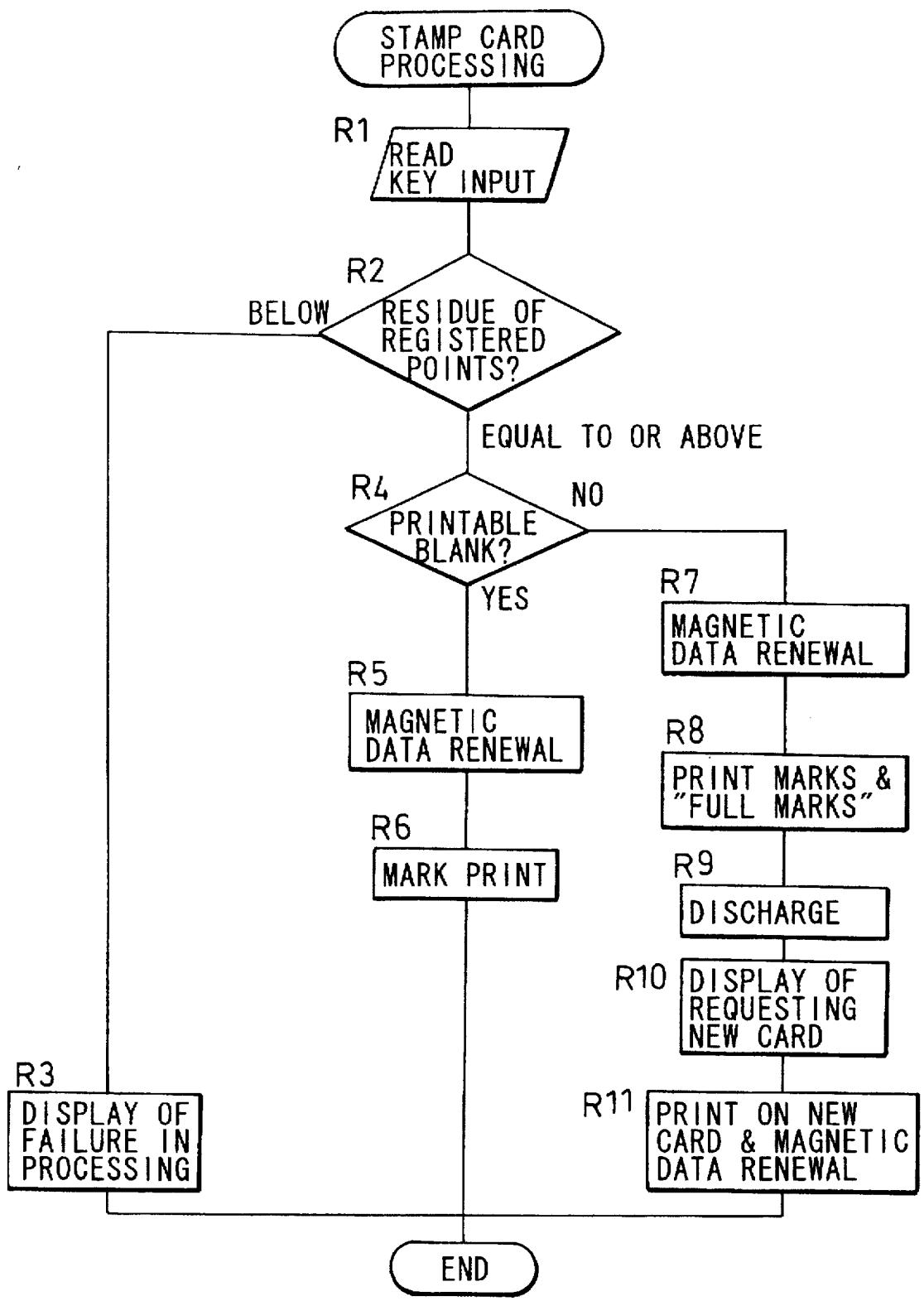
FIG. 6 is a flowchart showing another subroutine in control processing of the card reader/writer.

The stamp card processing in the step P7 (step Q6) executes a subroutine shown in the flowchart of FIG. 6. More particularly, in a step R1, a key operation of the key input section 23 is carried out, so that issue points are read or calculated based on an inputted sum. Then, in a step R2, it is judged whether or not a residue of points registered in the data memory 48 is equal to or more than the issue points. In the step R2, when the residue of the points registered in the data memory 48 is less than the issue points, a step R3 is executed to display a failure in processing on the liquid crystal display section 24A; whereas when the residue is equal to or more than the issue points, processing of a step R4 is executed. Registration of points in the data memory 48 is initially carried out by means of a system card which a shop purchases from the executive office of the organization, and issued points are subtracted from the registered points each time the issue of points is carried out.

In the step R4, data recorded in the utilization data record region 12e of the card 1 are used to judge the number of marks printed on the print record layer 11 of the card 1 and therefore the number of marks which can be thereafter printed on a blank portion of the print record layer 11. As a result, processing in a step R7 is executed when the number of marks printable exceeds the issue points, whereas processing in a step R5 and steps subsequent thereto is carried out when the number of marks printable is equal to or less than the issue points. In the step R5, data recorded in the utilization data record region 12e are renewed. Then, in a step R6, the number of marks corresponding to the number of the issue points are printed on the print record section 11 (see FIG. 10A).

In the step R7, the fact that the number of marks reaches a predetermined level is magnetically recorded in the utilization data record region 12e. Subsequently, in a step R8, not only marks in number printable are printed on the print record section 11 of the card 1, but letters indicating the fact that the number of marks reaches the predetermined level and the number of times of continuation or renewal of the card such as, for example, "CONGRATULATIONS, FULL MARKS" and "RENEWAL 3" are printed on the print record section 11 of the card 1, as shown in FIG. 10A. Then, a step R9 is executed so that the drive circuit 36 drives the drive rollers 35 to discharge the card 1 through the card access port 22 from the card reader/writer 2 and thereafter an indication of requesting insertion of a new card into the card reader/writer 2 is carried out on the liquid crystal display section 24A. When the sensor 31 detects insertion of the new card, remaining marks are printed on the new card and further items such as a sort of a stamp card, an issue date thereof, indication of continuation or renewal thereof, an issue number thereof and the like are printed on the card. Also, additional data are magnetically recorded in the utilization data record region 12e of the new card.

Figure 7:
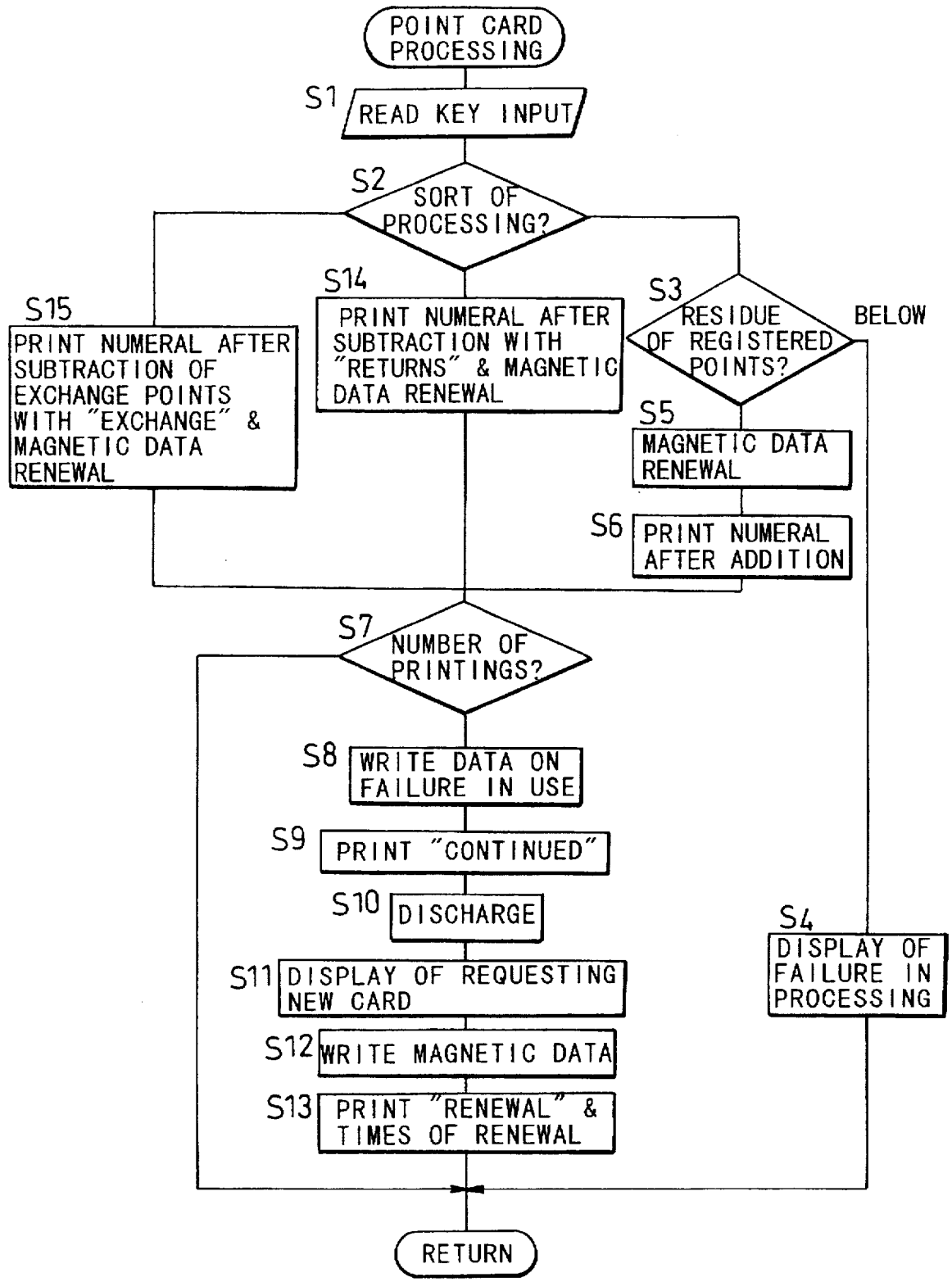
FIG. 7 is a flowchart showing a further subroutine in control processing of the card reader/writer.

Point card processing in the step P8 (step Q4) executes a subroutine shown in the flow chart of FIG. 7. More particularly, a key operation of the key input section 23 causes issue points to be read in a step S1 and then, in a step S2, it is discriminated whether or not processing designated by the key operation relates to one of "exchange", "returns" and "purchase". When processing to be carried out is discriminated to relate to "purchase" in the step S2, it is judged in a step S3 whether or not a residue of points registered in the data memory 48 is equal to or more than the issue points. As a result, when the residue of the registered points is less than the issue points, a failure in processing is displayed on the liquid crystal display section 24A or the like in a step S4; whereas when the residue is equal to or more than the issue points, processing in a step S5 is executed. Then, addition of data to the utilization data record region 12e is carried out for renewal in the step S5 by adding the issue points to the points recorded in the utilization data record region 12e of the card 1C, and then, in a step S6, followed by printing of a renewed numeral after the addition.

Then, in a step S7, it is judged whether or not the subsequent processing can be printed on the print record layer 11 of the card 1C depending on data recorded in the magnetic record section 12 as in the step R4 described above. When it is judged that the subsequent processing can be printed, the procedure is returned to the main routine, resulting in the card 1C being discharged; whereas when it is judged that the subsequent processing cannot be printed, data indicating a failure in further use are written in the magnetic record section 12 in a step S8. Subsequently, in a step S9, replacement of the card 1C with a new one is printed on a lowermost portion of the print record layer 11 or letters "CONTINUED" is printed on a line on the card 1C subsequent to a line on which the last transaction has been printed. Thereafter, the card 1C is discharged from the card reader/writer 2 in a step S10 and then an indication of requesting insertion of a new card into the card reader/writer 2 is displayed on the liquid crystal display section 24A in a step S11. Then, when the sensor 31 detects insertion of the new card into the card reader/writer 2, data are magnetically recorded in a utilization data record region 12e of the new card in a step S12 and a numeral indicating renewed points is printed on the new card in a step S13. Also, in the step S13, a sort of the new card (point card), an issue date thereof, an indication of renewal thereof (for example, RENEWAL 3), an issue number thereof and the like are printed on the new card.

Whereas, when processing to be carried out is discriminated to relate to "returns" in the step S2, a step S14 is executed. More particularly, the issue points are subtracted from points recorded in the utilization data record region 12e of the card 1C, so that a numeral obtained by the subtraction is printed together with letters "RETURNS" or the like on the card and concurrently the data in the utilization data record region 12e are replaced with the new data obtained by the subtraction. Further, when processing to be carried out is discriminated to relate to "exchange" in the step S2, a numeral after subtraction of exchange points from the recorded points is printed together with letters "EXCHANGE" or the like on the card 1C and data in the utilization data record region 12e are replaced with the new data obtained by the subtraction (see FIG. 11).

Figure 8:
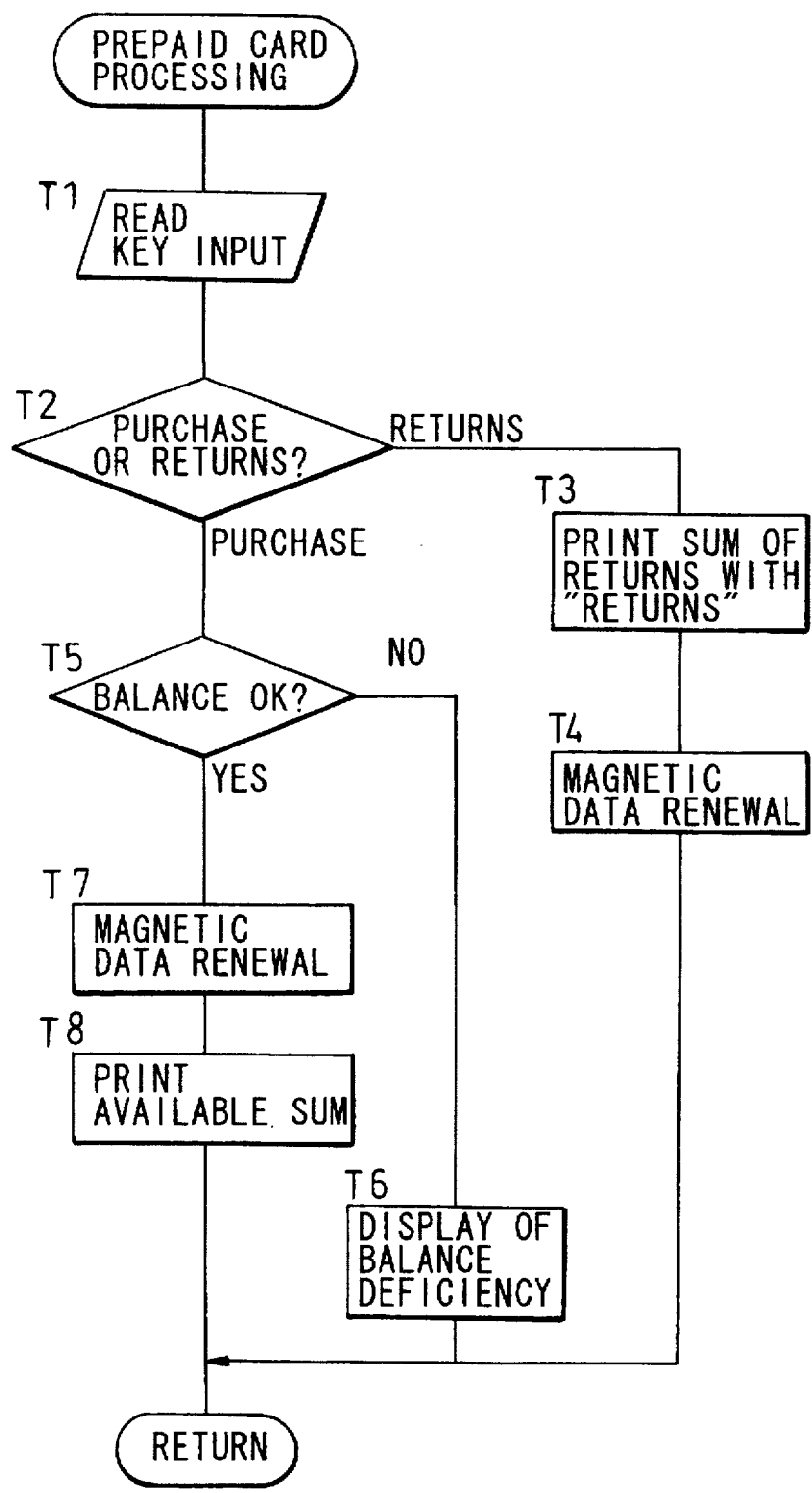
FIG. 8 is a flowchart showing still another subroutine in control processing of the card reader/writer.

Prepaid card processing executes a subroutine shown in the flowchart of FIG. 8. More particularly, in a step T1, a key operation of the key input section 23 is carried out to read data. Then, judgment on "purchase" or "returns" is made in a step T2. As a ressult, when judgment on "returns" is made, processing in each of steps T3 and T4 is executed; whereas in the case of "purchase", processing in a step T5 and each of steps subsequent thereto is carried out. In the step T3, a sum of the returns inputted through a key operation is added to a recorded sum, resulting in a new sum after the addition being printed together with letters "RETURNS" on the print record section 11 of the card 1A. Also, in the step T4, magnetic data are renewed.

In the step 5, it is judged whether or not a sum of purchase is equal to or less than a sum recorded in the card 1A, that is, whether or not a sum recorded in the card 1A is sufficient for purchase. As a result, when the sum recorded in the card 1A is less than the purchase sum, the liquid crystal display section 24A carries out, in a step T6, indication to the effect that the balance is not sufficient to permit the purchase. Also, when the recorded sum is equal to or more than the purchase sum, processing in each of the steps T7 and T8 is executed. In the step T7, a sum of expenditure on the purchase is subtracted from the sum recorded in the magnetic record section 12 of the card 1, resulting in a new sum or remaining amount thus obtained after the subtraction being substituted for the recorded sum. Then, in the step T8, the remaining amount is printed as an available sum on the print record section 11 of the card 1A.

The system setting processing briefly described above is carried out for setting of marks to be printed on the stamp card 1B, changing of arrangement of the marks, setting of a ratio of points to a sum, as well as registration of points in the data memory 48 and the like depending on a key operation of the key input section 23.

As described above, the card processing device of the illustrated embodiment permits the card made based on the same specifications to be used as a system card, a prepaid card, a point card or a stamp card as desired and commonly processed by means of the single card reader/writer, to thereby reduce a spatial disadvantage and a burden on management on a shop or the like. Also, the card reader/writer is constructed so as to discharge the card without executing any processing when the ID code previously registered in the card reader/writer does not coincide with the organization ID code recorded in the card. Such construction effectively prevents unjust use of the card. Also, when the card of which a sort or application is not yet specified is charged in the card reader/writer, it subjects the card to predetermined processing, to thereby specify the sort of the card, resulting in handling of the card being facilitated.

In the illustrated embodiment, the magnetic record section of the card has the card sort discrimination code, card provider ID code, organization ID code, card ID code and utilization data recorded therein. Further, it may have any additional data such as a date of utilization, the number of times of utilization, a date of issue of the card and the like recorded therein. Furthermore, the card reader/writer may be prohibited from writing data in the card provider ID code record region, organization ID code record region and card ID code record region of the magnetic record section of the card so as to ensure the security of the card processing.

In addition, the card processing device of the illustrated embodiment is adapted to be used in an organization scale by way of example. Alternatively, it may be independently used by individual shops. When any shop or the like is to independently use the card processing device, a collating code peculiar to the shop or the like is recorded in place of the above-described organization ID code on the card and registered in the card reader/writer. Such construction, when a code of a card charged in the card reader/writer does not coincide with that registered in the card reader/writer, permits the card to be discharged therefrom. Alternatively, card provider codes may be registered in the card reader/writer, so that when a card provider code of a card charged in the card reader/writer does not coincide with any one of the card provider codes registered, such a card may be discharged therefrom.

Moreover, in the illustrated embodiment, the marks are printed on the point card while being arranged in a matrix-like manner. Alternatively, the marks may be arranged so as to define such predetermined graphics as shown in FIG. 10B. Also, the mark is not limited to such a configuration as shown in FIG. 10A or 10B. Setting of the marks may be carried out by means of the system card.

As can be seen from the foregoing, the card processing device according to the present invention is so constructed that the magnetic record section of the card has the card sort discrimination code recorded therein, which is read by the card reader/writer, resulting in the card processing program being executed depending on the card sort discrimination code thus read. Such construction permits cards prepared based on the same specifications to be concurrently directed to various applications and commonly processed by the same card reader/writer irrespective of the applications, to thereby reduce burdens on installation of card reader/writers and management on a shop or the like.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A card processing device comprising:

a card provided on one surface thereof with a magnetic record section which permits magnetic data to be recorded therein and on the other surface thereof with a print record section which permits printing to be carried out thereon; and a card reader/writer adapted to be charged therein with said card, said card reader/writer including a data input key section, a printing means for printing on said print record section of said card according to a processing program through an operation of said data input key section and a read/write means for reading and writing data in said magnetic record section of said card when said card is charged in said card reader/writer;

said magnetic record section of said card including a card sort discrimination code record region for recording therein a card sort discrimination code indicating an application of said card;

said card reader/writer further including a program storage means in which a plurality of card processing programs are stored and a program selection and execution means for selecting one of the card processing programs from said program storage means depending on the card sort discrimination code read out from said card sort discrimination code record region and executing the one card processing program thus selected.

2. A card processing device as defined in claim 1, wherein said magnetic record section of said card further includes a card provider ID code record region for recording an ID code of a card provider therein, an organization ID code record region for recording therein an organization ID code of an organization which a card provider joins, a card ID code record region for recording an ID code of said card itself therein, and a utilization data record region for recording therein utilization data on utilization of said card.

3. A card processing device as defined in claim 2, wherein said card reader/writer includes a data memory means for storing therein the organization ID code previously registered, to thereby compare said registered organization ID code with said organization ID code read out from said organization ID code record region, resulting in said card being discharged without any of the card processing programs being executed when said registered organization ID code and said organization ID code do not coincide with each other.

4. A card processing device as defined in claim 1, wherein said card reader/writer is prohibited from writing data in said card provider ID code record region, organization ID code record region and card ID code record region of said magnetic record section of said card.

5. A card processing device as defined in claim 2, wherein said card reader/writer is prohibited from writing data in said card provider ID code record region, organization ID code record region and card ID code record region of said magnetic record section of said card.

6. A card processing device as defined in claim 3, wherein said card reader/writer is prohibited from writing data in said card provider ID code record region, organization ID code record region and card ID code record region of said magnetic record section of said card.

7. A card processing device as defined in claim 1, wherein said card sort discrimination code includes a system card code for discriminating a system card; and said card reader/writer is transferred to a system setting mode which permits system setting to be practiced by an operation of said data input key section when said read/write means reads said system card code.

8. A card processing device as defined in claim 2, wherein said card sort discrimination code includes a system card code for discriminating a system card; and said card reader/writer is transferred to a system setting mode which permits system setting to be practiced by an operation of said data input key section when said read/write means reads said system card code.

9. A card processing device as defined in claim 3, wherein said card sort discrimination code includes a system card code for discriminating a system card; and said card reader/writer is transferred to a system setting mode which permits system setting to be practiced by an operation of said data input key section when said read/write means reads said system card code.

10. A card processing device as defined in claim 4, wherein said card sort discrimination code includes a system card code for discriminating a system card; and said card reader/writer is transferred to a system setting mode which permits system setting to be practiced by an operation of said data input key section when said read/write means reads said system card code.

11. A card processing device as defined in claim 2, wherein said card sort discrimination code includes one of a prepaid card code and a customer bonus card code, which card codes discriminate between a prepaid card and a bonus card; and said program storage means is stored therein with a prepaid card processing program for recording a sum of expenditure with respect to an issued sum of the prepaid card both by printing a remaining amount on said print record section and magnetically recording said amount in said utilization data record region and a bonus card processing program for recording bonus points inputted through said data input key section both by printing the bonus points on said print record section and magnetically recording said bonus points in said utilization data record region.

12. A card processing device as defined in claim 3, wherein said card sort discrimination code includes one of a prepaid card code and a customer bonus card code, which card codes discriminate between a prepaid card and a bonus card; and said program storage means is stored therein with a prepaid card processing program for recording a sum of expenditure with respect to an issued sum of the prepaid card both by printing a remaining amount on said print record section and magnetically recording said amount in said utilization data record region and a bonus card processing program for recording bonus points inputted through said data input key section both by printing the bonus points on said print record section and magnetically recording said bonus points in said utilization data record region.

13. A card processing device as defined in claim 4, wherein said card sort discrimination code includes one of a prepaid card code and a customer bonus card code, which card codes discriminate between a prepaid card and a bonus card; and said program storage means is stored therein with a prepaid card processing program for recording a sum of expenditure with respect to an issued sum of the prepaid card both by printing a remaining amount on said print record section and magnetically recording said amount in said utilization data record region and a bonus card processing program for recording bonus points inputted through said data input key section both by printing the bonus points on said print record section and magnetically recording said bonus points in said utilization data record region.

14. A card processing device as defined in claim 7, wherein said card sort discrimination code includes one of a prepaid card code and a customer bonus card code, which card codes discriminate between a prepaid card and a bonus card; and said program storage means is stored therein with a prepaid card processing program for recording a sum of expenditure with respect to an issued sum of the prepaid card both by printing a remaining amount on said print record section and magnetically recording said amount in said utilization data record region and a bonus card processing program for recording bonus points inputted through said data input key section both by printing the bonus points on said print record section and magnetically recording said bonus points in said utilization data record region.

15. A card processing device as defined in claim 2, wherein said card sort discrimination code includes one of a prepaid card code, a first bonus card code and a second bonus card code, which card codes discriminate among a prepaid card, a first bonus card and a second bonus card; and said program storage means is stored therein with a prepaid card processing program for recording a sum of expenditure with respect to an issued sum of the prepaid card both by printing a remaining amount on said print record section and magnetically recording said amount in said utilization data record region, a first bonus card processing program for recording bonus points inputted through said data input key section by printing the number of marks corresponding to the number of said bonus points on said print record section and magnetically recording said bonus points in said utilization data record region, and a second bonus card processing program for recording bonus points inputted through said data input key section by printing a numeral on said print record section and magnetically recording the bonus points in said utilization data record region.

16. A card processing device as defined in claim 3, wherein said card sort discrimination code includes one of a prepaid card code, a first bonus card code and a second bonus card code, which card codes discriminate among a prepaid card, a first bonus card and a second bonus card; and said program storage means is stored therein with a prepaid card processing program for recording a sum of expenditure with respect to an issued sum of the prepaid card both by printing a remaining amount on said print record section and magnetically recording said amount in said utilization data record region, a first bonus card processing program for recording bonus points inputted through said data input key section by printing the number of marks corresponding to the number of said bonus points on said print record section and magnetically recording said bonus points in said utilization data record region, and a second bonus card processing program for recording bonus points inputted through said data input key section by printing a numeral on said print record section and magnetically recording the bonus points in said utilization data record region.

17. A card processing device as defined in claim 4, wherein said card sort discrimination code includes one of a prepaid card code, a first bonus card code and a second bonus card code, which card codes discriminate among a prepaid card, a first bonus card and a second bonus card; and said program storage means is stored therein with a prepaid card processing program for recording a sum of expenditure with respect to an issued sum of the prepaid card both by printing a remaining amount on said print record section and magnetically recording said amount in said utilization data record region, a first bonus card processing program for recording bonus points inputted through said data input key section by printing the number of marks corresponding to the number of said bonus points on said print record section and magnetically recording said bonus points in said utilization data record region, and a second bonus card processing program for recording bonus points inputted through said data input key section by printing a numeral on said print record section and magnetically recording the bonus points in said utilization data record region.

18. A card processing device as defined in claim 7, wherein said card sort discrimination code includes one of a prepaid card code, a first bonus card code and a second bonus card code, which card codes discriminate among a prepaid card, a first bonus card and a second bonus card; and said program storage means is stored therein with a prepaid card processing program for recording a sum of expenditure with respect to an issued sum of the prepaid card both by printing a remaining amount on said print record section and magnetically recording said amount in said utilization data record region, a first bonus card processing program for recording bonus points inputted through said data input key section by printing the number of marks corresponding to the number of said bonus points on said print record section and magnetically recording said bonus points in said utilization data record region, and a second bonus card processing program for recording bonus points inputted through said data input key section by printing a numeral on said print record section and magnetically recording the bonus points in said utilization data record region.

19. A card processing device as defined in claim 15, wherein said card reader/writer includes a preferential execution program designation means for designating which of said first bonus card processing program and second bonus processing program should be preferentially executed, so that when any card sort discrimination code does not exist in said card sort discrimination code record region of said card, the program designated by said preferential execution program designation means is executed and a card sort discrimination code corresponding to the program designated is written in said card sort discrimination code record region of said card.

20. A card processing device as defined in claim 1, wherein said print record section of said card comprises one of a self-coloring print record layer and a print record layer of a heat-reversible opaque type, which is laminated on a sheet-like substrate of said card; and said printing means includes a print head comprising a thermal head.

21. A card processing device as defined in claim 2, wherein said print record section of said card comprises one of a self-coloring print record layer and a print record layer of a heat-reversible opaque type, which is laminated on a sheet-like substrate of said card; and said printing means includes a print head comprising a thermal head.

22. A card processing device as defined in claim 3, wherein said print record section of said card comprises one of a self-coloring print record layer and a print record layer of a heat-reversible opaque type, which is laminated on a sheet-like substrate of said card; and said printing means includes a print head comprising a thermal head.

23. A card processing device as defined in claim 4, wherein said print record section of said card comprises one of a self-coloring print record layer and a print record layer of a heat-reversible opaque type, which is laminated on a sheet-like substrate of said card; and said printing means includes a print head comprising a thermal head.

* * * * *

UNITED STATES PATENT AND TRADEMARK OFFICE
CERTIFICATE OF CORRECTION

PATENT NO. : 5,783,809
DATED : July 21, 1998
INVENTOR(S) : Koji Niino and Hideo Yuji It is certified that error appears in the above-identified patent and that said Letters Patent is hereby corrected as shown below:

Column 4, line 29, "record- layer" should read --record layer--.

Signed and Sealed this

Twenty-fourth Day of November, 1998

Attest:

BRUCE LEHMAN

Attesting Officer

Commissioner of Patents and Trademarks